July 20, 1943.     O. I. H. EKMAN ET AL     2,324,685
RESILIENT STRETCHER-SUPPORTING DEVICE FOR VEHICLES
Filed March 4, 1940     4 Sheets-Sheet 1
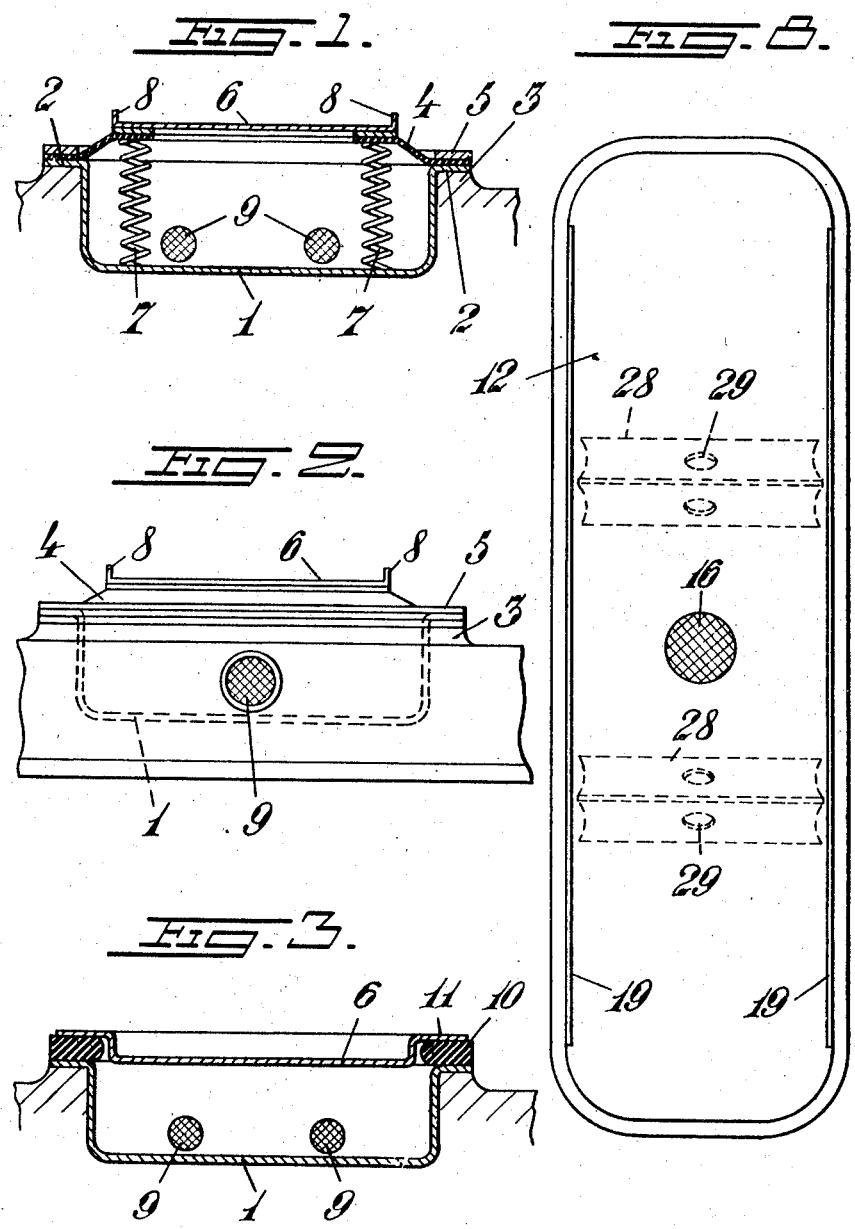
Inventors
Olof Ingemar Harald Ekman
Hans Teodor Nicou
by Sommers & Young
Attorneys

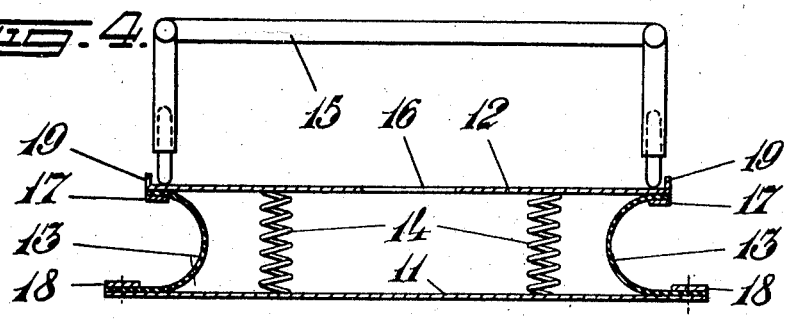
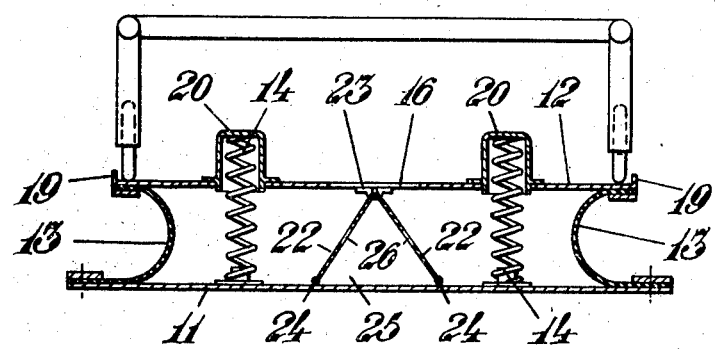
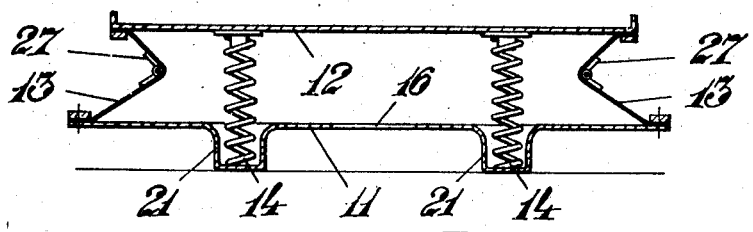
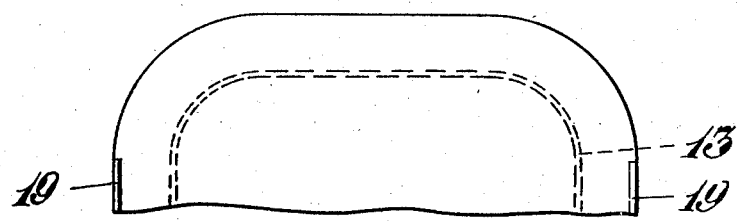

July 20, 1943.     O. I. H. EKMAN ET AL     2,324,685
RESILIENT STRETCHER-SUPPORTING DEVICE FOR VEHICLES
Filed March 4, 1940     4 Sheets-Sheet 3
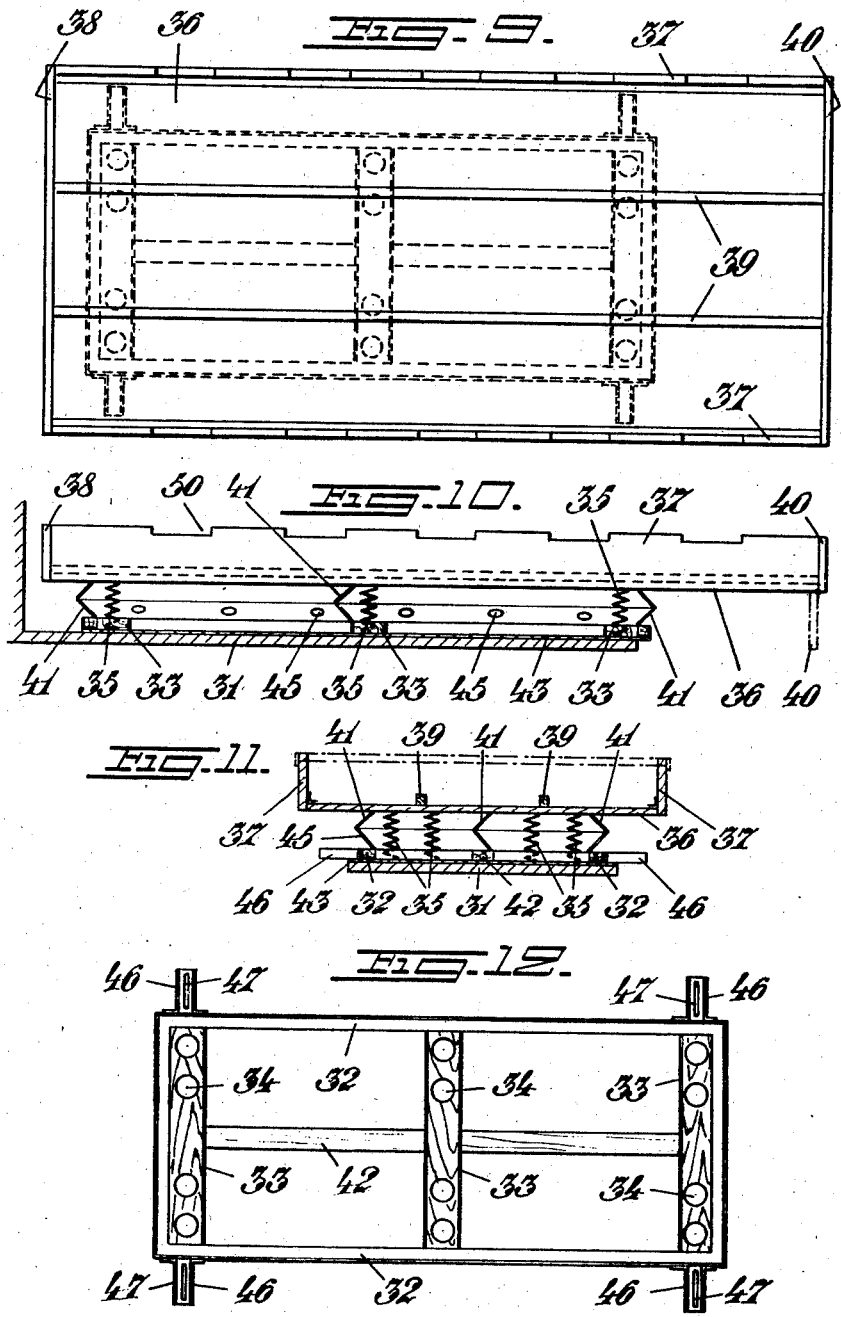
Inventors
Olof Ingemar Harald Ekman
Hans Teodor Nicou
by Sommers & Young
Attorneys

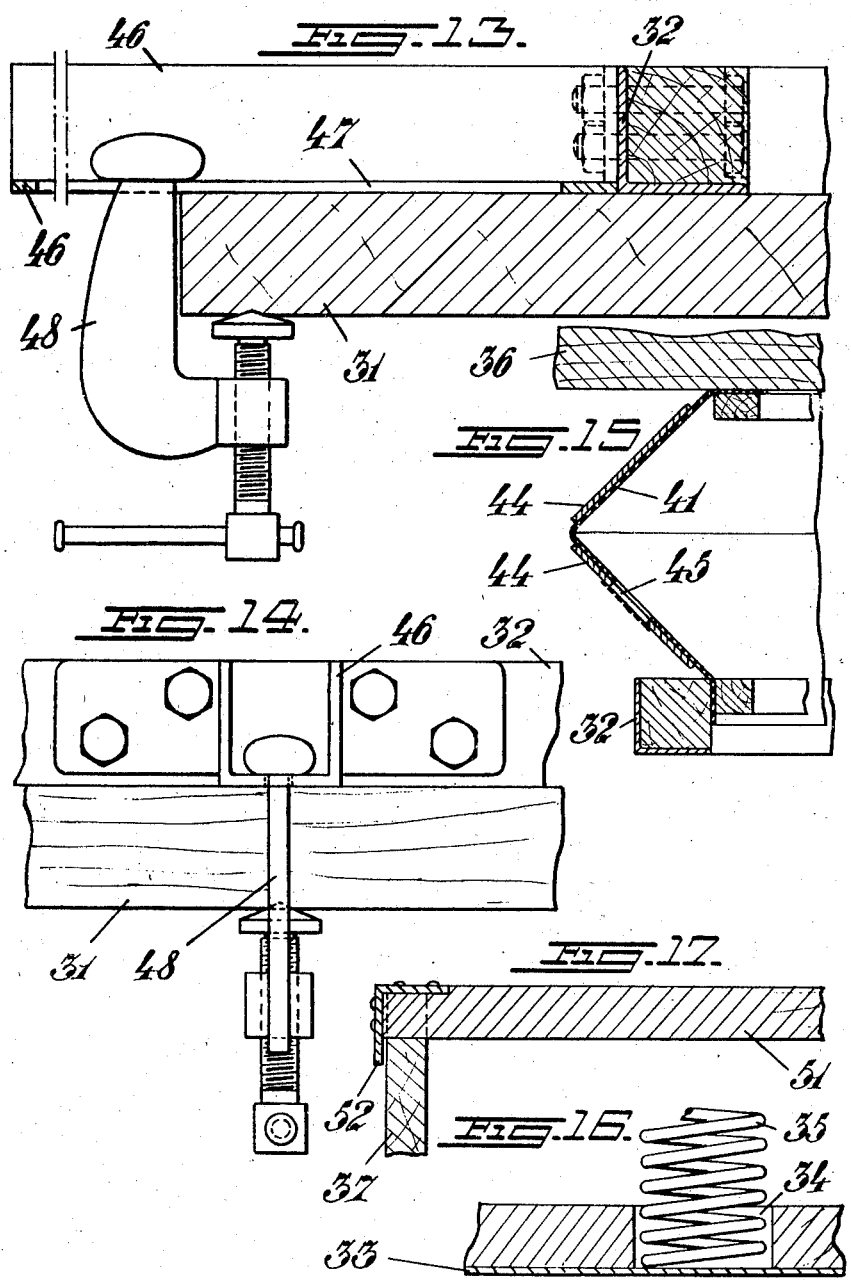

Patented July 20, 1943

2,324,685

UNITED STATES PATENT OFFICE 2,324,685

RESILIENT STRETCHER-SUPPORTING DEVICE FOR VEHICLES

Olof Ingemar Harald Ekman, Stockholm, and Hans Teodor Nicou, Sodra Angby, near Stockholm, Sweden Application March 4, 1940, Serial No. 322,234
In Sweden December 7, 1938

2 Claims. (Cl. 296—19)

This invention relates to a resilient stretcher-supporting device for vehicles the spring suspension of which is not sufficiently weak to render the vehicle fit for use as an ambulance. The stretcher-supporting device forming the subject matter of this invention may either form an integral part of the vehicle or be constructed as a separate supporting device which may be placed on a vehicle within reach. In the said first-mentioned case the invention permits the erection of ambulance vehicles on frames less expensive than those originally constructed for ambulances. In both cases the supporting device may be constructed for supporting a single stretcher or a plurality of stretchers or, as an alternative, a larger number of sick or wounded seated persons.

The invention is characterized, chiefly, by a box-like structure the cover of which is resiliently supported and adapted to carry the stretcher or stretchers directly or indirectly and the inner space of which is closed with the exception of a port or ports of an appropriate area which permit such a restricted flow of air into and out of said space as to cause the air therein to act as a medium for cushioning the movements of the cover.

In the accompanying drawings, several embodiments of the invention are illustrated. Fig. 1 is a cross section of a supporting device for a single stretcher which is permanently built together with a vehicle. Fig. 2 is an end view of a modified form of such a supporting device. Fig. 3 is a cross section of another modified form of supporting device. Figs. 4–6 are cross sections of three different embodiments of devices each of which is adapted to support a single stretcher. Said devices need not be permanently fixed to a vehicle but may form separate, portable supporting devices. Fig. 7 is a plan view of part of the cover of such a supporting device. Fig. 8 is a plan view of such a supporting device on a smaller scale. Fig. 9 is a plan view of a supporting device permanently connected to a platform for supporting a plurality of stretchers. Fig. 10 is a longitudinal section of the supporting device shown in Fig. 9 and a side elevation of the platform connected therewith. Fig. 11 is a cross section of the structure shown in Fig. 9. Fig. 12 is a plan view of the frame of the supporting device of said structure. Fig. 13 is a cross section on a larger scale of the fastening mechanism of said frame. Fig. 14 is a side elevation of said fastening device, as seen from the left hand side of Fig. 13. Figs. 15 and 16 show details of the supporting device on a still larger scale. Fig. 17 shows a detail of accessories.

With reference to Fig. 1, the numeral 1 indicates a box, preferably of sheet metal, which is so dimensioned as to be capable of receiving, in its free space, a stretcher which may be either undivided or suitably folded. The box is shown as embedded in a floor, as for instance, the floor of an ambulance automobile, built on a chassis the spring suspension of which is not sufficiently weak to allow a stretcher to be placed directly on the floor. The longer walls and the shorter walls of said box rest by flanges 2 on an elevated border 3 provided on the floor. Clamped to the flange 2 by means of a metallic frame 5 is the outer circumference of an elastic or flexible frame-like piece 4. Said elastic or flexible piece 4 carries at its inner periphery a plate 6 forming the cover of the box 1. Due to the elasticity or flexibility of the frame-like piece 4 said cover may move up and down within certain limits. Normally, the cover is held in its uppermost position by means of springs 7, which may, for instance, be situated near the four corners of the cover. Said springs are so dimensioned as to be capable of supporting the cover with a loaded stretcher situated thereon, while affording an appropriate resilience.

In order to guide a stretcher while resting on the cover, the cover is provided with an upstanding flange 8 at either longitudinal side. As an alternative, for the same purpose, special bars, as for instance, angle bars or channel iron, may be used, or the cover may be formed with longitudinally extending grooves, formed by depressing the material of the cover which both guide the stretcher and strengthen the cover, especially, when made of sheet metal.

The cover and its flexible frame 4 close the box practically airtightly. By the provision of ports to put the interior of the box into communication with the atmosphere, the large quantity of air contained in the box may be utilized as a cushion to damp the downward movement of the cover 6. In Fig. 1, two such ports are shown at 9 as provided in one of the shorter walls of the box. The ports may, preferably, be provided with air filters. By suitably dimensioning the springs 7 and the area of the ports 9 any desired spring tension and cushioning effect may be obtained.

Fig. 2 shows a port 9 provided in the rear end wall of the vehicle floor which communicates with the interior of the box 1 of Fig. 1 at the rear end thereof.

Instead of metallic springs to support the cover 6 a frame of soft rubber may be used, as shown at 10 in Fig. 3. Such a frame replaces both the elastic frame 4 and the springs 7 of Fig. 1. In Fig. 3 the cover 6 is formed with a central depression leaving an elevated flange 11 at the periphery which rest upon the rubber member 10. The vertical parts of said flange may act as lateral guiding members for the stretcher.

The elastic or flexible frame 4 of Figs. 1 and 2 may be replaced by a piece of cloth or canvas covering the opening of the box and supporting the cover 6. If desired, the cover may be removable. In order to allow the insertion of the stretcher into the box, and the removal of the stretcher therefrom, a shutter may be provided in the rear short wall of the box or in the cover thereof; as an alternative, the cover as a whole may be removable.

In order to increase the air quantity acting as a cushion to damp the movements of the cover, the interior of the box may communicate with a receptacle or tank situated at the side thereof or at some other place of the vehicle.

A variation of the damping or cushioning effect may be obtained by making the ports for the air adjustable, so that the driver may vary the damping effect according to the state of the road, the speed of travel, etc. In such case, the ports for the air may, preferably, be provided in the front wall of the box beyond the driver's seat, so that the valves of the ports may be readily accessible. The ports for the air may, if desired, be provided with automatic valves which open as a result of an increased pressure in the box. If desired, separate inlet ports and outlet ports may be used. Such ports require non-return valves in order to cause the flow of the air to take place in the direction desired.

The box need not necessarily be embedded in the floor of the vehicle but may be mounted in some other way, and may, for instance, be portable.

In Figs. 4–6 different forms of portable supporting devices are shown. In these embodiments, the side walls and end walls of the box are elastic or flexible to their entire extent. This permits a reduction of the dimensions of the box, inasmuch as the box, as seen in top plan view, need not be larger than a stretcher. In addition, the use of such elastic or flexible walls permits a folding of the stretcher into compact form for storage purposes.

The stretcher supporting device shown in Fig. 4 comprises a plane bottom 11, a likewise plane cover 12 and side walls 13, and end walls, not shown, which interconnect the bottom and the cover. The side walls, as well as the end walls, consists of a flexible or elastic material, as for instance, canvas, or rubber cloth etc. They are so connected to the cover and the bottom as to curve inwardly when the cover is depressed. The cover is normally held in a lifted state by springs 14 which may, preferably, be situated at the corners of the box, said springs being so dimensioned as to keep the cover in an intermediate position when the cover supports a stretcher and its load, allowing the cover to oscillate up and down about said intermediate position under the influence of the shocks to which the vehicle is subjected in running. The cover 12 is provided with a port 16, or ports, to allow the air contained in the box to be used as a medium for cushioning or damping the oscillations of the cover. Said opening which may, of course, be formed in any suitable part of the box, may be provided with a filter which allows the air to pass but retains solid particles. As shown, the bottom is only slightly wider than the cover. In folding the box by pressing the cover into contact with the bottom, those flanges 17 which connect the side walls and the end walls with the cover 12, will position themselves inside the flanges 18 which connect the side walls and end walls to the bottom 11. In folded state, the supporting device, as a result, only occupies a minimum of space as far as the height is concerned. A large number of such folded supporting devices may thus be placed one upon the other within a space of small height.

At the longitudinal sides of the cover, upstanding flanges 19 are provided to prevent a stretcher standing on the cover from sliding out laterally.

With the springs 14 positioned directly between the bottom and the cover of the box, as shown in Fig. 4, it may happen that the length of the springs will be too small for the required elastic movements of the cover. In order to allow the use of longer springs the cover 12 may be provided with upstanding sleeves 20 to receive the upper ends of the springs, as shown in Fig. 5, or the bottom 11 may be provided with depending sleeves 21 to receive the lower ends of the springs, as shown in Fig. 6. To permit an easy removal and insertion of the sleeves and the springs, as for storage purpose, the sleeves may be removable, as indicated in Fig. 5. In Fig. 6 integral sleeves 21 are shown which may act as legs for the box. In Fig. 6 the port for the air 16 is provided in the bottom of the box.

In order to prevent the cover from heeling over laterally, that is to say, turning about a longitudinal axis, longitudinally extending partitions may be provided inside the box, as shown at 22 in Fig. 5, which do not interfere with the up and down movement of the cover. Said partitions 22 are connected to the cover 12 by a hinge 23 permitting the partitions to move independently of each other. At their lower edge the partitions carry rollers 24 in contact with the bottom of the box. Upon depression of the cover the lower edges of the partitions 22 retire from each other while still keeping the space of the box divided into two identical lateral sections and an intermediate triangular section 25. The partitions 22 are formed with ports 26 allowing a restricted passage of air between the various sections. Each of the lateral sections of the space of the box acts independently to prevent a heeling over of the cover 12 to the respective side.

In Fig. 6 a modified form of side walls 13 is shown. Each side wall as well as each end wall consists of a piece of canvas or the like reinforced along the straight portion of the wall by a hinge-like member 27 which permits a depression of the cover towards the bottom while preventing the side walls and end walls from bulging outwardly. A similar construction may be used in substitution of the movable partitions 22 of Fig. 5.

Fig. 7 shows that the surrounding wall 13 of the box, including the side walls and the end walls, is rounded at its corners. Fig. 7 also shows part of the upstanding flanges 19 acting to prevent a lateral sliding of a stretcher placed upon the cover of the box.

In Fig. 8, two pairs of transversely extending partitions 28 are shown which act to eliminate a heeling over of the cover at its ends. Said partitions 28 may be constructed in the same way as the partitions 22 of Fig. 5. The pairs of partitions 22 divide the interior of the box into three sections which communicate with each other by parts 29 formed in the partitions which permit a restricted flow of air between the various sections. Instead of two pairs of partitions, a single pair may, of course, be used.

The various forms of the stretcher supporting device thus far described are only constructed to carry an individual stretcher. Hereinbelow an embodiment of the device adapted for supporting a plurality of stretchers will be described. Slight modifications may render this device fit for carrying a still larger number of seated persons. Such a supporting device may be placed on every lorry or delivery van having a platform or floor of ordinary dimensions. By this means, usual platform lorries or delivery vans may be readily transformed into ambulance vehicles permitting an indulgent transportation of sick or wounded persons. To this end the resilient supporting device is rigidly connected with a platform fit for carrying a plurality of stretchers, the supporting device and this platform constituting a unitary structure. The supporting device proper should, preferably, be so dimensioned as to allow its placing upon lorry platforms of any usual size. The supporting device may be provided with appropriate means for clamping it to the lorry platform or delivery van floor.

In certain of the Figures 9 to 17 a platform 31 of a lorry not otherwise shown is indicated. The stretcher supporting structure includes a base frame 32 which is adapted to rest on the platform (as 31) of the lorry. Said base frame 32 may comprise, for instance, angle bars filled with wood (see Fig. 13). Inserted between the longitudinal members of the base frame are transverse bars 33 consisting, for instance, of channel bars filled with wood. In the wood holes 34 are made adapted to receive the lower ends of helical springs 35 adapted to support a platform 36. Said platform may be provided with suitable guiding means for the upper ends of the springs. Along its longer edges and one of its shorter edges, the platform 36 is provided with upstanding rigid walls 37 and 38, respectively. On the upper surface of the platform 36 ribs 39 are disposed extending parallel with the side walls 37 which divide the area of the platform into three equal sections, each of which is adapted to support two stretchers situated in alinement. At its remaining end the platform carries a hingedly connected or removable end wall 40, Figs. 9 and 10.

The space between the base frame 32 and the platform 36 is enclosed by a flexible wall of strong canvas 41 attached on the one hand to the longer and shorter members of frame 32 and on the other hand to the lower surface of the platform 36. Flexible partitions which may, likewise, comprise pieces of canvas attached on the one hand to the transverse beams 33 and to a longitudinal rib 42 in the middle of the frame, respectively, and the lower surface of the platform 36, divide the space thus enclosed into four separate cells or "bellows," closed at their top by the platform 36 and at their bottom by a plate 43 of masonite, plywood or the like, secured to the lower surface of the base frame 32. If desired, the whole base frame may be replaced by such a plate. The surrounding canvas wall and the canvas partitions, both of which are indicated by the reference numeral 41, are reinforced at their middle portions by plates 44, as for instance, aluminium plates. Through these plates and the canvas ports 45 extend to permit a restricted passage of air into and out of the individual bellows above referred to.

One or more such ports 45 belonging to each individual bellow may be more or less closed to permit adjustment of the total area of passage for each bellow.

The longer members of the base frame 32 carry, preferably adjacent their ends, short U-bearers 46, Figs. 12-14, which project from said members at right angles thereto, the lateral flanges of said bars facing upwardly. In the web of each such U-bearer there is a longitudinally extending slot 47 adapted to act as a guide for a clamping arm 48, which inside the U-bearer carries a head by which said arm is maintained in its engagement with the slot 47. By means of the clamping arm the bearer may be clamped to the platform 31 of a lorry (cfr. Figs. 13 and 14).

In the upper edge of the rigid side walls 37 of the platform 31 portions are cut out, as shown at 50, to receive seats 51, Fig. 17, which at their free ends carry angular fittings 52 to keep the seats in position. The seats may be clamped to the platform 36, as for instance, by belts when not in use, so that they do not interfere with the placing of stretchers on the platform.

The platform 36, the springs 35, the flexible walls 41, and the base frame 32 constitute a unitary structure which may be readily lifted up onto the platform of a lorry and clamped thereto by the arms 48 and their clamping screws. The size of the platform of the lorry may vary within wide limits, inasmuch as the clamps may be readily adjusted to the proper points of the slots 47 according to the width of the platform of the lorry. Similarly, the structure is in a high degree independent of the length of the platform 31. Thus, the structure may, without any change, be used on lorries of very different sizes. The clamps 48 having been tightened, the structure is ready for immediate use, so that the stretchers with the sick or wounded persons resting thereon, may be placed on the platform 36 after the rear end wall 40 thereof has been folded down. During the drive, the springs 35 secure a sufficient elasticity, while at the same time the pneumatic cushioning device, represented by the bellows 41 and their ports 45, acts to absorb shocks and damp the movements of the springs so that the platform 36 and the stretchers carried thereby may only be subjected to slight, slow and weak movements. The transportation of the sick or wounded persons will, therefore, be as indulgent as ever possible.

If it is desired to use the structure for the transportation of seated persons, the seats 51 are placed across the platform 37 so that they engage the recesses 50. If necessary, the ports 45 are closed to a more or less extent in order to increase the damping action to bring it into agreement with the greater load. Such an adjustment may be obtained in a simple way by closing certain ports 45 by means of shutters. The structure may, thus, be changed in a simple way from a device for carrying sick persons resting on stretchers into a device for carrying seated persons, and vice versa, so that in either case a sufficient and adequately damped elasticity may be obtained.

Certain modifications may be made without departing from the principle of the invention. Instead of placing seats in recesses, as 50, formed in the upper edge of the side walls, as 37, of the platform for the transportation of seated persons, brackets may be secured to the inside of the side walls 37 for supporting the seats. The clamping of the platform or the base frame of the structure to the platform of a lorry may be effected in a different way from that illustrated. For instance, the front end of the base frame may be adapted to be secured to the rear wall of the driver's cabin of a lorry. In this case, said rear wall and the front end of the base frame should be provided with appropriate fastening elements.

What we claim is:

1. A resilient stretcher-supporting device for vehicles comprising a box-like structure including a rigid bottom, elastic or flexible side and end walls, a cover carried by said side and end walls so as to be capable of moving upwardly and downwardly, springs to support said cover, partitions in said box-like structure comprising rigid members in pivotal connection with the cover of the structure and in sliding connection with the bottom thereof, said partitions dividing the interior of the structure into a plurality of chambers, said chambers being connected to each other and to the atmosphere by ports of restricted areas of passage to allow the air contained in the chambers to act as a medium for damping the movements of the cover under the action of a load thereon, while the structure is carried by a travelling vehicle.

2. A resilient stretcher-supporting device for vehicles, comprising a flat box-like structure including a rigid bottom member, side members and a top member movable upwardly and downwardly relatively to the bottom member, said top member being so dimensioned as to be capable of supporting one or more stretchers, springs resting on the bottom member to support the top member, and means to divide the interior of the box into separate chambers, said chambers being in communication with the atmosphere through holes of restricted areas of passage in order to allow the air quantities contained in said chambers individually to act as a medium for cushioning and damping the movements of the top member.

OLOF INGEMAR HARALD EKMAN.
HANS TEODOR NICOU.